United States Patent
Ho et al.

(10) Patent No.: US 8,913,049 B2
(45) Date of Patent: Dec. 16, 2014

(54) MOTION DETECTION CIRCUIT AND MOTION DETECTION METHOD

(71) Applicant: Novatek Microelectronics Corp., Hsinchu (TW)

(72) Inventors: Hsi-Chi Ho, Hsinchu (TW); Kuei-Chung Chang, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 141 days.

(21) Appl. No.: 13/831,971

(22) Filed: Mar. 15, 2013

(65) Prior Publication Data

US 2014/0132574 A1 May 15, 2014

(30) Foreign Application Priority Data

Nov. 12, 2012 (TW) ............................... 101142079 A

(51) Int. Cl.
*G09G 5/00* (2006.01)
*H04N 5/14* (2006.01)
*G09G 5/393* (2006.01)

(52) U.S. Cl.
CPC .. *G09G 5/00* (2013.01); *H04N 5/14* (2013.01); *G09G 5/393* (2013.01); *G09G 2320/106* (2013.01); *G09G 2330/022* (2013.01); *G09G 2360/10* (2013.01)
USPC .......................................... 345/204; 348/701

(58) Field of Classification Search
CPC .................... G09G 2360/10; G09G 2360/127; G09G 2320/0261; G09G 2320/0266; G09G 2320/10; G09G 2320/106; G09G 2320/103; H04N 5/14; H04N 5/144; H04N 5/145; H04N 5/147
USPC ........................................... 345/204; 348/701
See application file for complete search history.

(56) References Cited

U.S. PATENT DOCUMENTS

| | | | | |
|---|---|---|---|---|
| 2005/0219188 | A1* | 10/2005 | Kawabe et al. | 345/94 |
| 2009/0327777 | A1* | 12/2009 | Vasquez et al. | 713/320 |
| 2013/0050254 | A1* | 2/2013 | Tran et al. | 345/629 |

* cited by examiner

*Primary Examiner* — Adam R Giesy
(74) *Attorney, Agent, or Firm* — Jianq Chyun IP Office

(57) ABSTRACT

A motion detection method is adapted for an image display circuit including a motion detection circuit and an arbitration circuit. In this motion detection method, a number of motion quality observation windows are defined. Each motion quality observation window includes a start point and an ending point. In the motion quality observation windows, a write frame count value is adjusted according to a write frame command. At the end point of each motion quality observation window, if the write frame count value is equal to or bigger than a preset count value, an enable signal is outputted to the arbitration circuit to determine whether the image display circuit performs motion display. In the motion quality observation windows, the end point of the i-th motion quality observation window is located between the start point and the end point of the (i+1)-th motion quality observation window, where i is a positive integer.

18 Claims, 5 Drawing Sheets

_US 8,913,049 B2_

MOTION DETECTION CIRCUIT AND MOTION DETECTION METHOD

CROSS-REFERENCE TO RELATED APPLICATION

This application claims the priority benefit of Taiwan application serial no. 101142079, filed on Nov. 12, 2012. The entirety of the above-mentioned patent application is hereby incorporated by reference herein and made a part of this specification.

BACKGROUND OF THE INVENTION

1. Field of the Invention

The invention generally relates to a detection circuit and a detection method thereof, and more particularly, to a motion detection circuit and a motion detection method thereof.

2. Description of Related Art

With the coming of information era, people are no longer satisfied with receiving and transmitting of information in the form of the pure text or static picture. Instead, high quality flat display apparatuses are used to display meticulous motion images.

Therefore, in order to play the motion images, an image display circuit usually utilizes its motion detection circuit to detect whether a currently received video image is a motion image. In addition, the motion detection circuit outputs the detection result to an arbitration circuit of the image display circuit to determine whether the image display circuit continues the motion display or exits the motion display. However, in the conventional motion detection mechanism, the motion detection circuit utilizes a fixed window period to determine whether the image display circuit exits the motion display. When the image updating time of the video image is unpredictable, the image display circuit often needs to wait more time to exit the motion display.

SUMMARY OF THE INVENTION

Accordingly, the invention is directed to a motion detection method which can enable its image display circuit to quickly exit the motion display thus reducing the waiting time and power consumption.

The invention is also directed to a motion detection circuit which can enable its image display circuit to quickly exit the motion display thus reducing the waiting time and power consumption.

The invention provides a motion detection method adapted for an image display circuit. The image display circuit includes a motion detection circuit and an arbitration circuit. The motion detection method includes the following steps. A plurality of motion quality observation windows is defined. Each motion quality observation window includes a start point and an ending point. In the motion quality observation windows, a write frame count value is adjusted according to a write frame command. At the end point of each motion quality observation window, if the write frame count value is equal to or bigger than a preset count value, an enable signal is outputted to the arbitration circuit to determine whether the image display circuit performs motion display. In the motion quality observation windows, the end point of the i-th motion quality observation window is located between the start point and the end point of the (i+1)-th motion quality observation window, where i is a positive integer.

In one embodiment, in the motion quality observation windows, the end point of the i-th motion quality observation window is located between the start point and the end point of the (i+2)-th motion quality observation window.

In one embodiment, in the motion quality observation windows, the end point of the i-th motion quality observation window is located before the start point of the (i+2)-th motion quality observation window.

In one embodiment, each motion quality observation window includes N frame periods, corresponding to a window size signal of the motion quality observation windows, a window size thereof is set as M in the motion quality observation windows, where N is a positive integer, M is a nonnegative integer, and M is less than or equal to N.

In one embodiment, the method further includes setting the preset count value to M.

In one embodiment, in the step of adjusting the write frame count value, the write frame count value is continuously accumulated in the motion quality observation windows.

In one embodiment, the step of adjusting the write frame count value includes, when the write frame command corresponds to that the image data is written into the motion detection circuit, increasing the accumulated write frame count value according to the write frame command.

In one embodiment, the step of adjusting the write frame count value includes, when the write frame command corresponds to that the image data is not written into the motion detection circuit, decreasing the accumulated write frame count value according to the write frame command.

The invention additionally provides a motion detection circuit including a frame count circuit and a motion determination circuit. In a plurality of motion quality observation windows, the frame count circuit adjusts a write frame count value according to a write frame command and outputs the write frame count value. Each motion quality observation window includes a start point and an end point. The motion determination circuit is coupled to the frame count circuit. At the end point of each motion quality observation window, if the write frame count value is equal to or bigger than a preset value, the motion determination circuit outputs an enable signal to the arbitration circuit to determine whether an image display circuit performs motion mage display. In the motion quality observation windows, the end point of the i-th motion quality observation window is located between the start point and the end point of the (i+1)-th motion quality observation window, where i is a positive integer.

In one embodiment, in the motion quality observation windows, the end point of the i-th motion quality observation window is located between the start point and the end point of the (i+2)-th motion quality observation window.

In one embodiment, in the motion quality observation windows, the end point of the i-th motion quality observation window is located before the start point of the (i+2)-th motion quality observation window.

In one embodiment, each motion quality observation window includes N frame periods, corresponding to a window size signal of the motion quality observation windows, a window size thereof is set as M in the motion quality observation windows, where N is a positive integer, M is a nonnegative integer, and M is less than or equal to N.

In one embodiment, the preset count value of the motion determination circuit is set as M.

In one embodiment, the write frame count value is continuously accumulated in the motion quality observation windows.

In one embodiment, when the write frame command corresponds to that the image data is written into the motion detection circuit, the frame count circuit increases the accumulated write frame count value according to the write frame command.

In one embodiment, when the write frame command corresponds to that the image data is not written into the motion detection circuit, the frame count circuit decreases the accumulated write frame count value according to the write frame command.

In one embodiment, the frame count circuit includes a selector, an adder, and a counter unit. The selector unit selectively outputs a first count value or a second count value according to the write frame command. The adder unit is coupled to the selector unit for adding the write frame count value and the first count value or the second count value and outputting an adding result. The counter unit is coupled to the adder unit for accumulating the write frame count value according to the adding result and outputting the write frame count value according to a frame clock signal.

In one embodiment, the motion determination circuit includes a comparator unit and a counter unit. The comparator unit compares the write frame count value with the preset count value and outputs a comparison result. The counter unit is coupled to the comparator unit for receiving the comparison result and outputting the enable signal to the arbitration circuit according to a frame clock signal.

In view of the foregoing, in exemplary embodiments of the invention, the motion detection circuit and detection method can enable the image display circuit to quickly exit the motion display by adjusting the number of offset frames of the motion quality observation windows, thus reducing the waiting time and power consumption.

Other objectives, features and advantages of the invention will be further understood from the further technological features disclosed by the embodiments of the invention wherein there are shown and described preferred embodiments of this invention, simply by way of illustration of modes best suited to carry out the invention.

DESCRIPTION OF THE EMBODIMENTS

Figure 1:
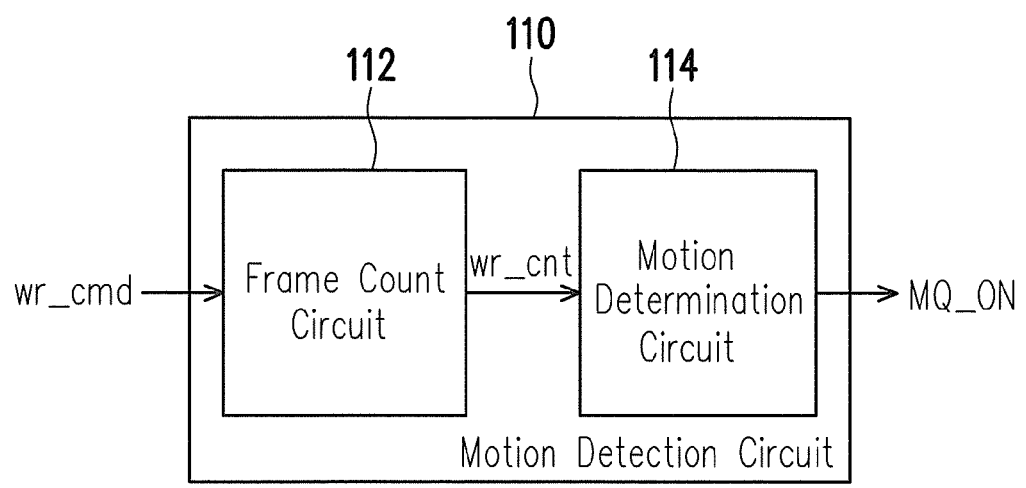
FIG. 1 is a general block diagram of a motion detection circuit illustrating relevant technology of the invention.
Figure 2:
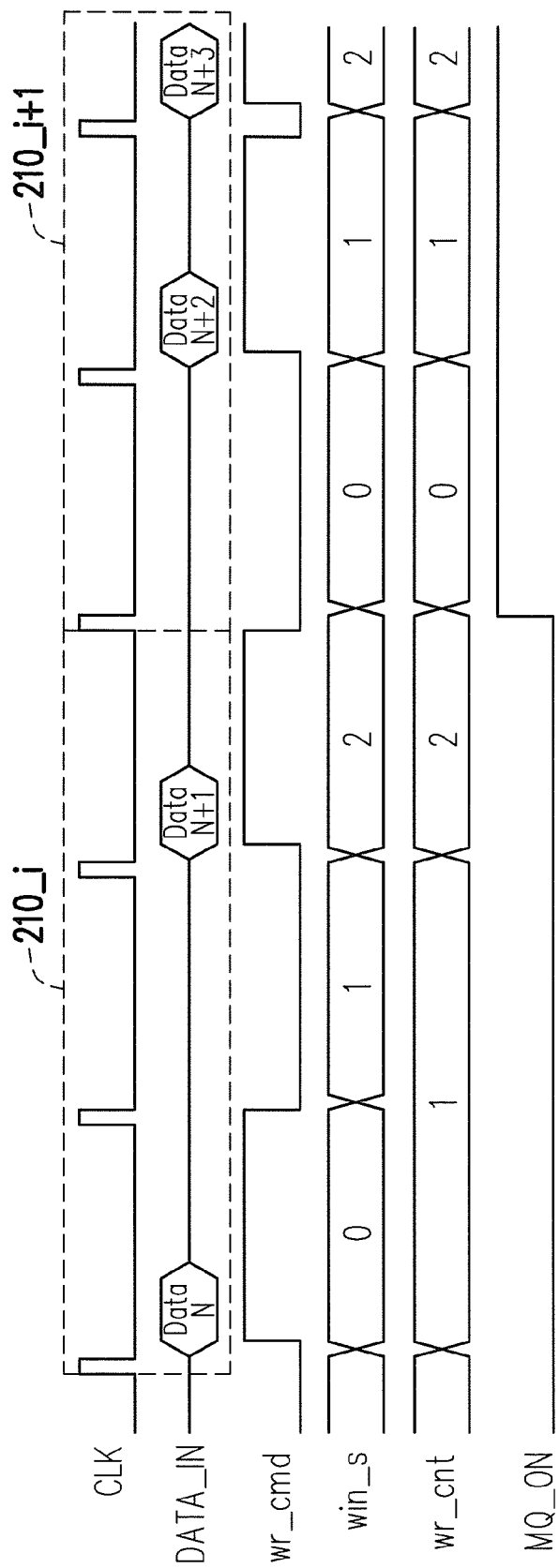
FIG. 2 illustrates waveforms of various signals of the motion detection circuit of FIG. 1.

FIG. 1 is a general block diagram of a motion detection circuit illustrating relevant technology of the invention. FIG. 2 illustrates waveforms of various signals of the motion detection circuit of FIG. 1. Referring to FIG. 1 and FIG. 2, in this example, the motion detection circuit 110 includes a frame count circuit 112 and a motion determination circuit 114. The frame count circuit 112 outputs a write frame count value wr_cnt according to a write frame command wr_cmd. The motion determination circuit 114 is coupled to the frame count circuit 112 and outputs an enable signal MQ_ON to an arbitration circuit (not shown) downstream of the motion detection circuit 110 according to the write frame count value wr_cnt, such that the arbitration circuit accordingly determines whether an image display circuit (not shown) associated with the motion detection circuit 110 performs a motion display.

Specifically, in FIG. 2, a frame clock signal CLK indicates, for example, the frame period within which current operations of various circuit blocks are located in the image display circuit. In this example, rising edges of two high level pulses define one frame period. Image input data DATA_IN refers to, for example, video data received by the image display circuit and the motion detection circuit 110, including data packet DATA_N to DATA_N+3. Responsive to write-in of the data packet DATA_N to DATA_N+3, the write frame command wr_cmd is at high level when the data packet is written in; otherwise, the write frame command wr_cmd is at low level. When receiving the high level write frame command wr_cmd, the frame count circuit 112 increases the write frame count value wr_cnt. When receiving the low level write frame command wr_cmd, the frame count circuit 112 does not adjust the write frame count value wr_cnt. As such, as shown in FIG. 2, between the data packet DATA_N and DATA_N+1, the write frame count value wr_cnt is 1; after the data packet DATA_N+1, the write frame count value wr_cnt is 2. It is noted that, here, accumulation of the write frame count value starts from 0.

In this relevant technology, a motion quality observation window is defined to have N frame periods, and each motion quality observation window is offsetted by constant N frames, where N=3. For example, as shown in FIG. 2, the i-th motion quality observation window 210_i of the motion detection circuit 110 includes three frame periods, the (i+1)-th motion quality observation window 210_i+1 also includes three frame periods, where i is a positive integer. In addition, an end point of the i-th motion quality observation window 210_i is substantially a start point of the (i+1)-th motion quality observation window 210_i+1, i.e. offsetted by three frames. The time length and offset length of other motion quality observation windows in this example may be deduced by analogy according to the above description and therefore are not described further herein.

At the end point of each motion quality observation window, if the write frame count value wr_cnt is 2, then the motion determination circuit 114 outputs the high level enable signal MQ_ON to the arbitration circuit. This indicates that the number of motion images detected by the motion detection circuit 110 has reached a preset value, and therefore, the image display circuit performs the motion display. In this embodiment, a threshold count value M preset in the motion determination circuit 114 is 2 (M=2), which means that when the frame count value wr_cnt exceeds 2, the motion display operation continues to perform. Otherwise, the image display circuit exits the motion display.

In addition, in this relevant technology, corresponding to the window size signal winch—s of the motion quality observation window, the window size in each motion quality observation window changes with the sequence, i.e. sequentially being 0, 1, 2, as shown in FIG. 2. In addition, at the start point of each motion quality observation window, the window size is reset to 0. At the same time, at the start point of each motion quality observation window, the write frame count value wr_cnt is also reset to 0 rather than being continuously accumulated by the frame count circuit 112. That is, in each motion quality observation window, both the window size of each window size signal win_s and the write frame count value wr_cnt are recalculated.

Under this architecture, the motion quality observation window of the motion detection circuit 110 is defined as N. In each motion quality observation window, if the motion detection circuit 110 detects that motion data update occurs in M frames, i.e. N>M, then the image display circuit may enable the motion display. However, in actual operation, if a previous motion quality observation window has M+1 updating frames, it indicates that the image display circuit is currently in the motion display status. When the number of the updating frames in the current motion quality observation window is less than M, the image display circuit cannot response timely and does not exit the motion display until the end of the current motion quality observation window. Therefore, the image display circuit under this architecture needs to wait more time to exit the motion display, which often wastes power.

Figure 3:
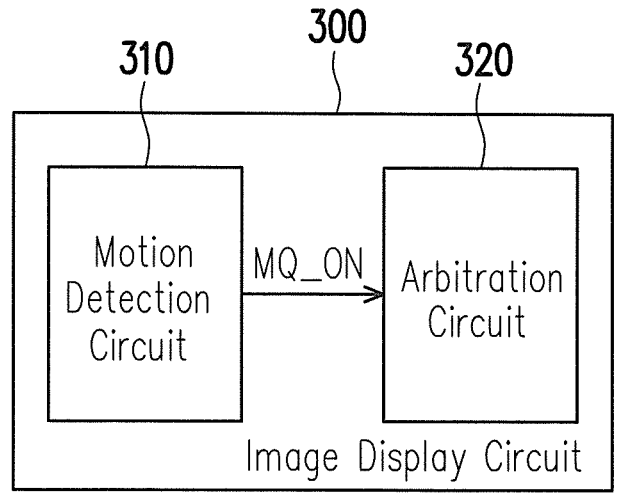
FIG. 3 is a general block diagram of an image display circuit according to one embodiment of the invention.
Figure 4:
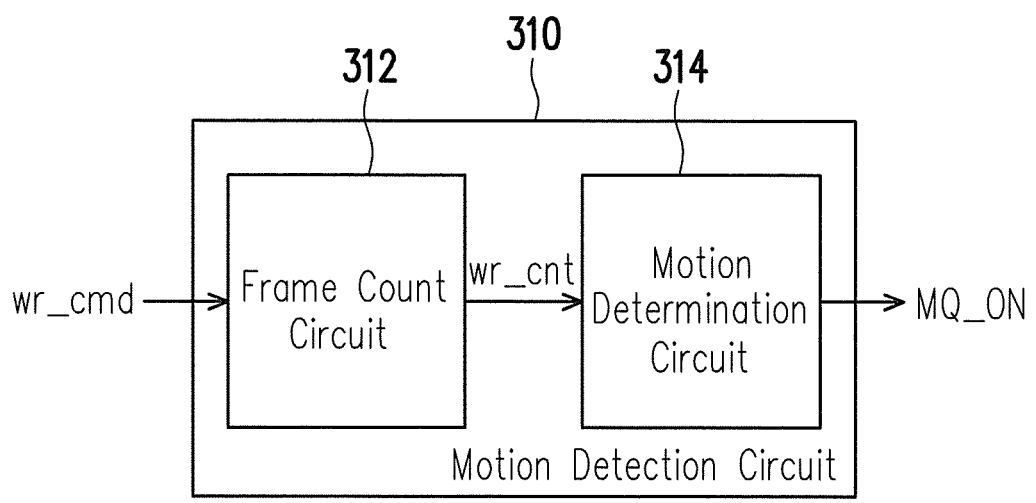
FIG. 4 is a general block diagram of a motion detection circuit according to one embodiment of the invention.
Figure 5:
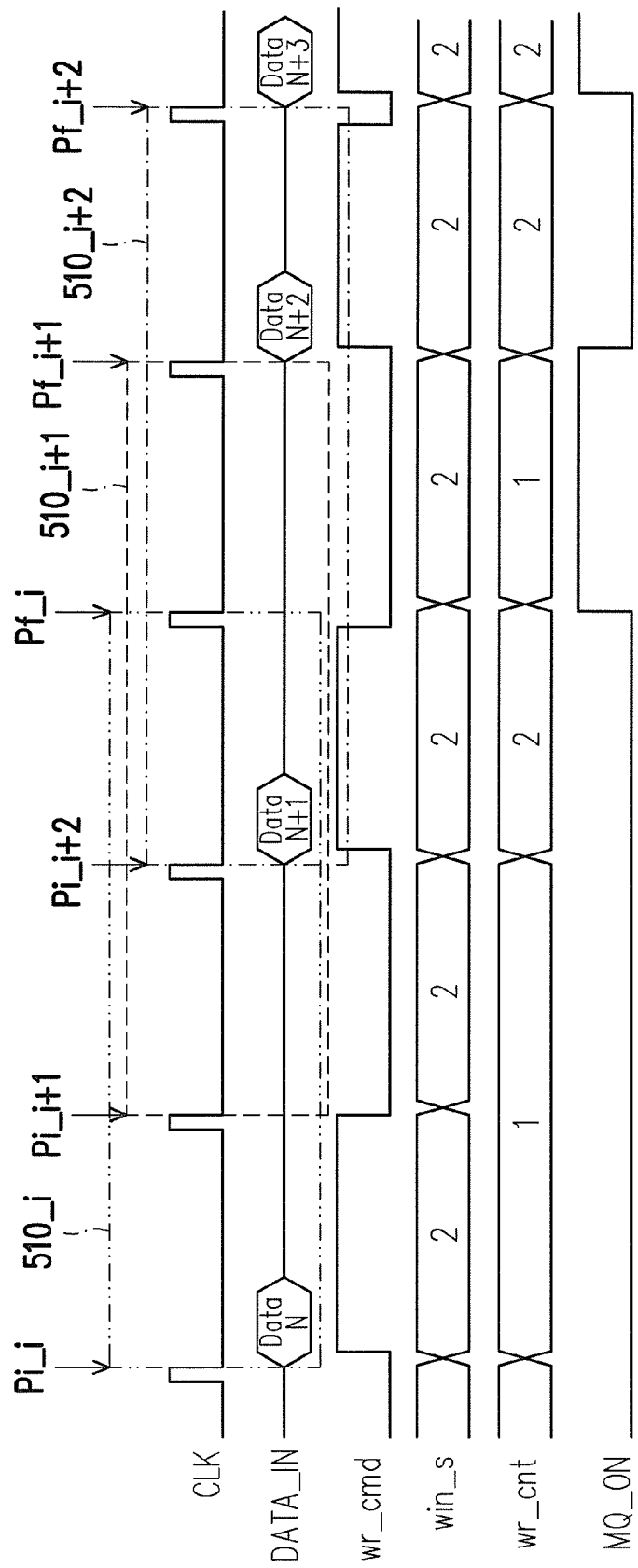
FIG. 5 illustrates general waveforms of various signals of the motion detection circuit of FIG. 4.

FIG. 3 is a general block diagram of an image display circuit according to one embodiment of the invention. FIG. 4 is a general block diagram of a motion detection circuit according to one embodiment of the invention. FIG. 5 illustrates general waveforms of various signals of the motion detection circuit of FIG. 4. Referring to FIG. 3 to FIG. 5, the image display circuit 300 of the present embodiment includes a motion detection circuit 310 and an arbitration circuit 320. The arbitration circuit 320 is coupled to the motion detection circuit 310. The motion detection circuit 310 outputs an enabling signal MQ_ON to the arbitration circuit 320, such that the arbitration circuit 320 determines whether the image display circuit 300 performs the motion display.

Specifically, the motion detection circuit 310 of the present embodiment includes a frame count circuit 312 and a motion determination circuit 314. In each motion quality observation window, the frame count circuit 312 adjusts the write frame count value wr_cnt according to the write frame command wr_cmd, and outputs the write frame count value wr_cnt to the motion determination circuit 314. In the present embodiment, each motion quality observation window includes a start point and an end point. For example, the motion quality observation window 510_i includes a start point Pi_i and an end point Pf_i, the motion quality observation window 510_i+1 includes a start point Pi_i+1 and an end point Pf_i+1, and the motion quality observation window 510_i+2 includes a start point Pi_i+2 and an end point Pf_i+2, where i is a positive integer.

In the present embodiment, each motion quality observation window is defined to have N frame periods, where N=3, and each motion quality observation window is offsetted by one frame. For example, as shown in FIG. 5, each of the motion quality observation windows 510_i, 510_i+1, 510_i+2 includes three frame periods. In addition, as shown in FIG. 5, in these motion quality observation windows, the end point Pf_i of the i-th motion quality observation window 510_i is located between the start point Pi_i+1 and end point Pf_i+1 of the (i+1)-th motion quality observation window 510_i+1, and between the start point Pi_i+2 and end point Pf_i+2 of the (i+2)-th motion quality observation window 510_i+2. The time length and offset length of other motion quality observation windows in this example may be deduced by analogy according to the above description and therefore are not described further herein. In other words, the offset value of each motion quality observation window of this embodiment is set as one frame. However, the invention should not be limited to this particular offset value. Rather, in another embodiment, the offset value can be set as two frames. In that case, taking FIG. 5 as an example, the end point Pf_i of the i-th motion quality observation window 510_i is still located between the start point Pi_i+1 and end point Pf_i+1 of the (i+1)-th motion quality observation window 510_i+1, but the end point Pf_i of the i-th motion quality observation window 510_i is located before the start point Pi_i+2 of the (i+2)-th motion quality observation window 510_i+2.

Therefore, in summary, in exemplary embodiments of the invention, if each motion quality observation window is defined to have N frame periods, the offset value of each motion quality observation window can be set as one, two, three, . . . , or N−1 frames. In the above embodiment, because N=3, the offset value can be one or two depending upon actual requirements and should not be limited to a particular value, and the embodiment of FIG. 5 is merely illustrative.

With continuous reference to FIG. 4, the motion determination circuit 314 is coupled to the frame count circuit 312. At the end point of each motion quality observation window, if the write frame count value wr_cnt is equal to or bigger than a preset count value M, the motion determination circuit outputs the enable signal MQ_ON to the arbitration circuit 320 to determine whether the image display circuit 300 continues the motion display or exits the motion display. Here, the preset count value M is less than or equal to N, and M is a nonnegative integer.

Specifically, at the end point of each motion quality observation window, if the write frame count value wr_cnt is M, then the motion determination circuit 314 outputs a high level enable signal MQ_ON to the arbitration circuit 320, which indicates that the number of the motion images detected by the motion detection circuit 310 has reached the preset value, such that the image display circuit 300 continues the motion display. In this example, the preset threshold count value M within the motion determination circuit 314 is equal to 2, which indicates that when the frame count value wr_cnt exceeds two, the motion display operation continues to be performed. Otherwise, the image display circuit 300 exits the motion display operation.

Taking the i-th motion quality observation window 510_i as an example, at the start point Pi_i, the data packet DATA_N is written into the motion detection circuit 310. Therefore, the frame count circuit 312 correspondingly receives the high level write frame command wr_cmd and thereby increases the accumulated write frame count value wr_cnt. As such, before the next data packet DATA_N+1 is received, the accumulated write frame count value wr_cnt is equal to 1. Then, when the data packet DATA_N+1 is written into the motion detection circuit 310, the frame count circuit 312 correspondingly receives the high level write frame command wr_cmd, and thereby increases the accumulated write frame count value wr_cnt. As such, before the next data packet DATA_N+2 is received, the accumulated write frame count value wr_cnt is equal to 2. Therefore, at the end point Pf_i of the i-th motion quality observation window 510_i, the number of the motion images detected by the motion determination circuit 314 has reached the preset threshold value M=2, and the motion determination circuit 314 thereby outputs the high level enable signal MQ_ON to the arbitration circuit 320 to allow the image display circuit 300 to continue the motion display.

Taking the (i+1)-th motion quality observation window 510i+1 as another example, at the start point Pi_i+1, the write frame count value wr_cnt accumulated by the frame count circuit 312 is 1, and when the data packet DATA_N+1 is written into the motion detection circuit 310, the frame count circuit 312 correspondingly receives the high level write frame command wr_cmd and thereby increases the accumulated write frame count value wr_cnt, i.e. wr_cnt=2. Then, because no data packet is written into the motion detection circuit 310 before the next data packet DATA_N+2 is received, the write frame command wr_cmd is at low level. According to the architecture of the present embodiment, when the image data corresponding to the write frame command wr_cmd is not written into the motion detection circuit 310, the frame count circuit 312 decreases the accumulated write frame count value wr_cnt according to the write frame command wr_cmd. Therefore, the currently accumulated write frame count value wr_cnt is equal to 1. As such, at the end point Pf_i+1 of the (i+1)-th motion quality observation window 510_i+1, because the number of the motion images detected by the motion determination circuit 314 has not reached the preset threshold value M=2, the motion determination circuit 314 outputs the low level enable signal MQ_ON to the arbitration circuit 320, or can be considered as outputting no enable signal MQ_ON to the arbitration circuit 320, such that the image display circuit 300 exits the motion display. In addition, during the period of the (i+2)-th motion quality observation window 510_i+2, the operation of the motion detection circuit 310 may be deduced by analogy from the above description and therefore is not repeated herein.

Therefore, in the present embodiment, at the start point of each motion quality observation window, the write frame count value wr_cnt is not reset to 0, which can be continuously accumulated by the frame count circuit 212 rather than being recalculated at the start point of each motion quality observation window. In addition, in the present embodiment, corresponding to the window size signal winch_s of the motion quality observation window, the window size in each motion quality observation window maintains to be the preset count value M rather than changing with the sequence. In this example, M=2, as shown in FIG. 5.

Figure 6:
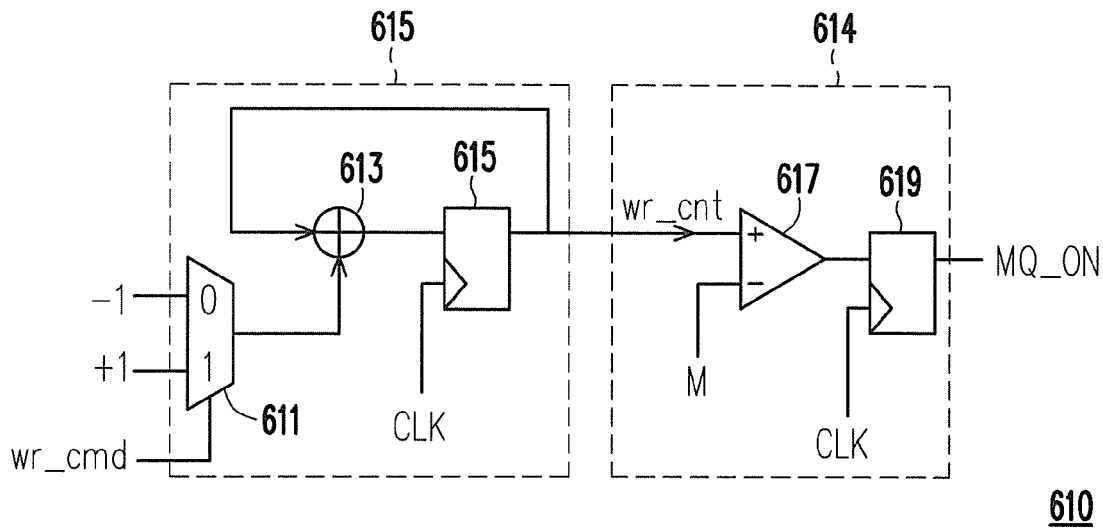
FIG. 6 is a general circuit diagram of a motion detection circuit according to one embodiment of the invention.

FIG. 6 is a general circuit diagram of a motion detection circuit according to one embodiment of the invention. Referring to FIG. 6, the frame count circuit 612 of the present embodiment includes a selector unit 611, an adder unit 613 and a counter unit 615. The selector unit 611 selectively outputs a first count value +1 or a second count value −1 to the adder unit 613 according to the write frame command wr_cmd. In this example, if the write frame command wr_cmd is at high level, the selector unit 611 selects to output the first count value +1 to the adder unit 613. On the contrary, if the write frame command wr_cmd is at low level, the selector unit 611 selects to output the second count value −1 to the adder unit 613. The adder unit 613 is coupled to the selector unit 611 for adding the write frame count value and the first count value +1 or the second count value −1 and outputting the adding result to the counter unit 615. The counter unit 615 is coupled to the adder unit 613 for accumulating the write frame count value wr_cnt according to the adding result, and outputting the write frame count value wr_cnt to the motion determination circuit 614 according to the frame clock signal CLK. Here, the counter unit 615 is, for example, a D flip-flop, which outputs the write frame count value wr_cnt to the motion determination circuit 614 during each frame period according to the frame clock signal CLK.

The motion determination circuit 614 includes a comparator unit 617 and a counter unit 619. The selector unit 617 may be implemented by a comparison amplifier which compares the write frame count value wr_cnt and the preset count value M and outputs the comparison result to the counter unit 619. The counter unit 619 is coupled to the comparator unit 617 to receive the comparison result and outputs the enable signal MQ_ON to the arbitration circuit according to the frame clock signal CLK. As described above, the offset value between each motion quality observation window may be set to be 1, 2, 3, ..., or N−1 frames by, for example, setting the frame clock signal CLK inputted into the counter unit 619. If it is set as 1, then the motion determination circuit 614 determines whether to exit the motion display upon one frame updating. If it is set as 2, then the motion determination circuit 614 determines whether to exit the motion display only after two frames are updated. Other settings may be deduced by analogy.

Figure 7:
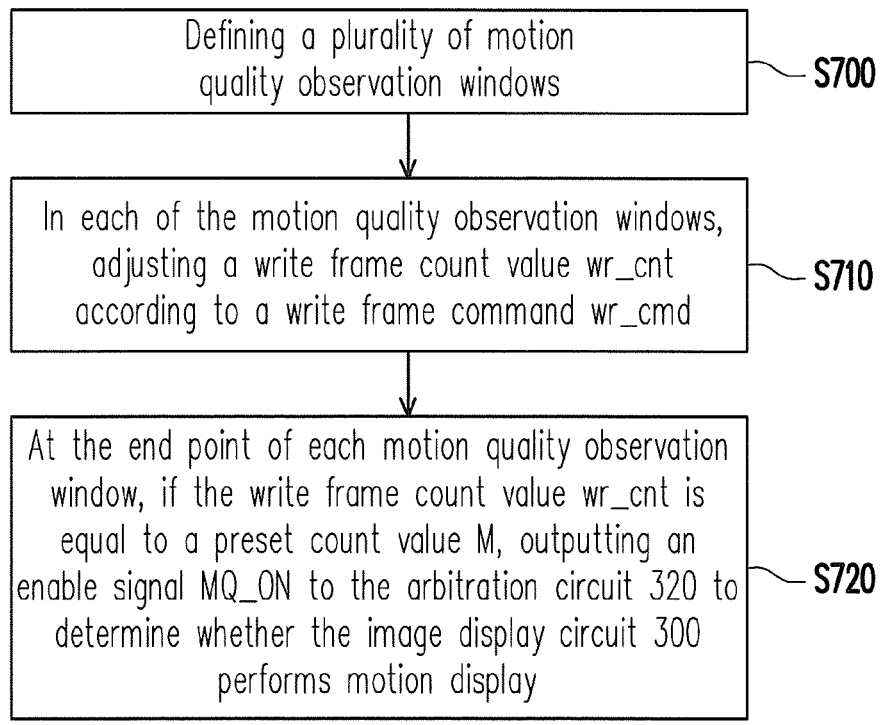
FIG. 7 illustrates a flow chart of a motion detection method according to one embodiment of the invention.

FIG. 7 illustrates a flow chart of a motion detection method according to one embodiment of the invention. Referring to FIG. 4 and FIG. 7, the motion detection method of the present embodiment is, for example, adapted to the motion detection circuit 310 of FIG. 4, which includes the following steps. At step S700, a plurality of motion quality observation windows is defined. Then, at step S710, in each motion quality observation window, the write frame count value wr_cnt is adjusted according to the write frame command wr_cmd. Later, at step S720, at the end point of each motion quality observation window, if the write frame count value wr_cnt is equal to or bigger than the preset count value M, the enable signal MQ_On is outputted to the arbitration circuit 320 to determine whether the image display circuit 300 performs the motion display.

In addition, teaching, suggestion and implementation of the motion detection method of embodiments of the invention can be sufficiently obtained from the embodiments of FIG. 3 to FIG. 6 and therefore are not repeated herein.

In summary, in exemplary embodiments of the invention, when the image display circuit starts the motion display, the offset value between each motion quality observation window may be set according to actual circuit designs to determine whether the image display circuit needs to exit the motion display. Therefore, when the motion image has stopped updating, the image display circuit of the present disclosure can exit the motion display in less time to reduce the waiting time and power consumption.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A motion detection method adapted for an image display circuit, wherein the image display circuit comprises a motion detection circuit and an arbitration circuit, the motion detection method comprising:
   defining a plurality of motion quality observation windows, wherein each of the motion quality observation windows comprises a start point and an ending point;
   in the motion quality observation windows, adjusting a write frame count value according to a write frame command; and
   at the end point of each of the motion quality observation windows, if the write frame count value is equal to or bigger than a preset count value, outputting an enable signal to the arbitration circuit to determine whether the image display circuit performs motion display,
   wherein in the motion quality observation windows, the end point of the i-th motion quality observation window is located between the start point and the end point of the (i+1)-th motion quality observation window, where i is a positive integer.

2. The motion detection method according to claim 1, wherein in the motion quality observation windows, the end point of the i-th motion quality observation window is located between the start point and the end point of the (i+2)-th motion quality observation window.

3. The motion detection method according to claim 1, wherein in the motion quality observation windows, the end point of the i-th motion quality observation window is located before the start point of the (i+2)-th motion quality observation window.

4. The motion detection method according to claim 1, wherein each of the motion quality observation windows comprises N frame periods corresponding to a window size signal of the motion quality observation windows, a window size thereof is set as M in the motion quality observation windows, where N is a positive integer, M is a nonnegative integer, and M is less than or equal to N.

5. The motion detection method according to claim 4, further comprising:
setting the preset count value to M.

6. The motion detection method according to claim 1, wherein in the step of adjusting the write frame count value, the write frame count value is continuously accumulated in the motion quality observation windows.

7. The motion detection method according to claim 6, wherein the step of adjusting the write frame count value comprises:
when the write frame command corresponds to that the image data is written into the motion detection circuit, increasing the accumulated write frame count value according to the write frame command.

8. The motion detection method according to claim 6, wherein the step of adjusting the write frame count value comprises:
when the write frame command corresponds to that the image data is not written into the motion detection circuit, decreasing the accumulated write frame count value according to the write frame command.

9. A motion detection circuit comprising:
a frame count circuit adjusting a write frame count value according to a write frame command and outputting the write frame count value in a plurality of motion quality observation windows, wherein each of the motion quality observation windows comprises a start point and an end point; and
a motion determination circuit coupled to the frame count circuit, wherein at the end point of each of the motion quality observation windows, if the write frame count value is equal to or bigger than a preset value, the motion determination circuit outputs an enable signal to the arbitration circuit to determine whether an image display circuit performs motion display,
wherein in the motion quality observation windows, the end point of the i-th motion quality observation window is located between the start point and the end point of the (i+1)-th motion quality observation window, where i is a positive integer.

10. The motion detection circuit according to claim 9, wherein, in the motion quality observation windows, the end point of the i-th motion quality observation window is located between the start point and the end point of the (i+2)-th motion quality observation window.

11. The motion detection circuit according to claim 9, wherein, in the motion quality observation windows, the end point of the i-th motion quality observation window is located before the start point of the (i+2)-th motion quality observation window.

12. The motion detection circuit according to claim 9, wherein, each of the motion quality observation windows comprises N frame periods corresponding to a window size signal of the motion quality observation windows, a window size thereof is set as M in the motion quality observation windows, where N is a positive integer, M is a nonnegative integer, and M is less than or equal to N.

13. The motion detection circuit according to claim 12, wherein the preset count value of the motion determination circuit is set as M.

14. The motion detection circuit according to claim 9, wherein the write frame count value is continuously accumulated in the motion quality observation windows.

15. The motion detection circuit according to claim 14, wherein when the write frame command corresponds to that the image data is written into the motion detection circuit, the frame count circuit increases the accumulated write frame count value according to the write frame command.

16. The motion detection circuit according to claim 14, wherein when the write frame command corresponds to that the image data is not written into the motion detection circuit, the frame count circuit decreases the accumulated write frame count value according to the write frame command.

17. The motion detection circuit according to claim 9, wherein the frame count circuit comprises:
a selector unit selectively outputting a first count value or a second count value according to the write frame command;
an adder unit coupled to the selector unit for adding the write frame count value and the first count value or the second count value and outputting an adding result; and
a counter unit coupled to the adder unit for accumulating the write frame count value according to the adding result and outputting the write frame count value according to a frame clock signal.

18. The motion detection circuit according to claim 9, wherein the motion determination circuit comprises:
a comparator unit comparing the write frame count value with the preset count value and outputting a comparison result; and
a counter unit coupled to the comparator unit for receiving the comparison result and outputting the enable signal to the arbitration circuit according to a frame clock signal.

* * * * *